United States Patent Office

3,544,266
Patented Dec. 1, 1970

3,544,266
FINELY DIVIDED SPINEL
Hayne Palmour III, and Halit Z. Dokuzoguz, Raleigh, N.C., assignors to Research Corporation, New York, N.Y., a nonprofit corporation of New York
No Drawing. Filed Mar. 5, 1968, Ser. No. 710,657
Int. Cl. C01f 7/02
U.S. Cl. 23—52                                3 Claims

ABSTRACT OF THE DISCLOSURE

Finely-divided magnesium aluminate spinel ($MgAl_2O_4$) is prepared by calcination of the solid compound or mixture obtained on cocrystallization of a stoichiometrically equivalent magnesium-aluminum salt mixture from aqueous solution.

---

This invention relates to a method for the preparation of magnesium aluminate spinel ($MgAl_2O_4$). In one specific aspect, it relates to a method for the preparation of fine-sized spinel powder particularly suited for use in making ceramic articles.

Magnesium aluminate spinel ceramics are known for their resistance to attack by acids and bases, their chemical and thermal stability and their generally refractory nature. Spinel powder, prepared by calcination of mixed magnesium and aluminum oxides or oxide precursors, has been fabricated into ceramics by the customary techniques of casting, extrusion and cold pressing, followed by sintering at about 1650°–1850° C. Ceramics made from conventional relatively large grain size spinel powders are difficult to densify and tend to be somewhat porous.

We have discovered that fine-sized crystalline spinel powder is prepared by calcining the compound or mixed solids obtained by cocrystallizatin of a stoichiometrically equivalent magnesium-aluminum salt mixture from aqueous solution. The stoichiometrically exact fine-sized spinel powder prepared according to the method of the present invention is useful as feed material in crystal growth or as a constituent in composites and when subjected to thermally activated processes, such as sintering, hot pressing, flame spraying and the like, yields nonporous ceramic articles of improved mechanical strength.

It is, therefore, a principal object of the present invention to provide a method for the preparation of fine-sized spinel powder particularly suited for use in making ceramic articles. This and other objects and advantages of the present invention will become apparent on consideration of the discussion and illustrative examples which follow:

The present invention is a method for the preparation of fine-sized magnesium aluminate spinel powder which comprises providing an aqueous solution containing stoichiometrically equivalent quantities of magnesium and aluminum as their heat-decomposable soluble salts, evaporating a portion of the water from the aqueous solution, chilling the solution to induce cocrystallization of the magnesium and aluminum salts and decomposing the cocrystallized magnesium and aluminum salt mixture by calcination at a temperature of about 700°–1050° C.

In practicing the process of the present invention, a particularly fine fluffy product is obtained on calcination when magnesium sulfate and aluminum sulfate are employed as the salt reactants. However, other magnesium and aluminum salts, or mixtures thereof, which decompose on heating to their oxides such as the nitrates, the acetates, the oxalates and the like, may be employed in place of part or all of the sulfate salt reactants. Since the presence of impurities may have an adverse effect on spinel preparation or on ultimate ceramic formation, reactants of high purity, such as analytical grade reagents, are preferred as starting materials. For the same reason, distilled and/or demineralized water and carefully cleaned plastic lined and corrosion-resistant apparatus should be utilized throughout the process and the product stored in plastic bags.

In order to achieve the exact stoichiometric equivalence required for optimum results, the reactants are analyzed and the correct proportions of reactants based on the analysis are carefully weighed out and dissolved in an excess of the amount of water required for solution. The resultant solution is heated with stirring to promote evaporation of water, preferably until it is reduced to about one-fifth of its original volume. Cocrystallization is induced by external chilling, and the almost solid compound or mixture containing the cocrystallized salts is transferred to a heat-resistant crucible for calcination. The contents of the crucible are gradually heated to 700°–1050° C. until the evolution of water and then gas is complete.

It should be noted that the present process is based on cocrystallization rather than coprecipitation of the mixed oxide precursor. No extraneous reagents are added to effect precipitation and the only impurities present in the calcined product are those carried over from the original starting materials. Further, stoichiometry is easily preserved, since filtering with an attendant danger of preferential leaching of one component is not required.

EXAMPLE 1

The starting materials employed were the analytical reagent grade hydrates designated $Al_2(SO_4)_3 \cdot 18H_2O$ and $MgSO_4 \cdot 7H_2O$. Using conventional gravimetric techniques, the weights of anhydrous $Al_2(SO_4)_3$ and $MgSO_4$ were determined by analysis and the water of crystallization in each salt was calculated by difference; the actual formulas were found to be $Al_2(SO_4)_3 \cdot 15.85H_2O$ and $MgSO_4 \cdot 6.436H_2O$. Exactly equivalent 0.05 molar quantities of each salt (11.8 grams of $MgSO_4 \cdot 6.436H_2O$ and 31.4 grams of $Al_2(SO_4)_3 \cdot 15.85H_2O$) were weighed out and dissolved in water. Using the general procedure described above, there was obtained on cocrystallization a mixed salt of the formula $MgAl_2(SO_4)_4 \cdot nH_2O$ wherein $n$ is approximately 26. Gravimetric analysis of the mixed salt indicated that the mole ratio of $Al_2(SO_4)_3$ to $MgSO_4$ was 1.00.

The magnesium aluminate obtained on calcination yielded this analysis:

$$\frac{\text{moles } Al_2O_3}{\text{moles } MgO} = 1.00$$

It is apparent that the exact stoichiometric ratio of aluminum to magnesium remains unchanged both after cocrystallization and after calcination.

EXAMPLE 2

The starting materials employed were $MgSO_4 \cdot 6.87H_2O$ and $Al_2(SO_4)_3 \cdot 19.2H_2O$. As in the previous example, the salts were analyzed individually and the exact quantities required for the ultimate stoichiometric ratio of spinel, e.g., 1.00 MgO: 1.00 $Al_2O_3$, were calculated. Thus, 12.1 pounds of the aluminum sulfate hydrate and 4.30 pounds of the magnesium sulfate hydrate were weighed out and dissolved with stirring in 30 liters of water contained in a 50 liter polyethylene vessel.

A 7 liter portion of the resultant solution was placed in a Teflon-coated aluminum vessel provided with a Teflon-coated magnetic stirrer and simmered for several hours at temperatures approaching 100° C. When the volume of the solution was reduced to approximately one-fifth of its original volume, the vessel was partially immersed in an ice bath while agitating its contents with a plastic spatula. Crystallization which started within a few moments on the cooled surfaces, spread quickly to convert the entire contents of the vessel to a white slushy mixture; no free liquid residue remained.

The resultant essentially solid cocrystallized magnesium aluminum sulfate compound was transferred to alumina calcining vessels equipped with protective lids. The covered crucibles were heated at a rate of approximately 100° C. per hour to a maximum temperature of approximately 1050° C., and maintained at that temperature for approximately three hours. During heating, both unbound water and water of crystallization were evolved principally over the range 80°–425° C., and breakdown of sulfates and evolution of gaseous oxides of sulfur, largely sulfur trioxide, occurred principally over the range 700°–1000° C. The thus formed oxides of magnesium and aluminum combined by solid state reaction principally over the range 800°–1050° C.

The calcined product was magnesium aluminate melting about 2135° C. of spinel structure (X-ray analysis) having a fairly uniform particle size of about 0.04 micron (electron microscopy) and a specific surface area of more than 25 square meters per gram (BET method). The finely divided spinel powder was converted by hot pressing to an optically transparent, pore-free, polycrystalline ceramic having a typical compressive strength of 400,000 lbs. per square inch at room temperature. The spinel ceramic was ductile at temperatures above about 1200° C., and had a compressive strength of about 15,000–30,000 p.s.i. at 1400° C.

Particularly desirable ceramics are obtained using the relatively impurity-free stoichiometrically exact magnesium aluminate spinel powder described above. However, using the basic approach of the present invention, the stoichiometric ratio of the metal cations can be varied to give alumina-rich spinels of the precise metal content desired and salts of metals other than magnesium and aluminum can be employed. Controlled amounts of dopants can be added to the salt solution prior to crystallization to improve pressing and ultimate strength characteristics. Other variations falling within the scope of the present invention will be apparent to those skilled in the art and our invention is as claimed.

We claim:

1. A method for the preparation of fine-sized magnesium aluminate spinel powder which comprises providing an aqueous solution containing stiochiometrically equivalent quantities of magnesium and aluminum as soluble magnesium and aluminum salts, said salts decomposable to their oxides on heating to about 700° C., evaporating water from the aqueous solution, chilling the solution to induce cocrystallization of the magnesium and aluminum salts, and decomposing the cocrystallized magnesium and aluminum salt mixture by calcination at a temperature of about 700°–1050° C.

2. A method according to claim 1 wherein the soluble salts are magnesium sulfate and aluminum sulfate.

3. A method according to claim 2 wherein the aqueous solution is evaporated to approximately one-fifth of its original volume.

References Cited

UNITED STATES PATENTS 2,805,167    9/1957    McCreight et al. _____ 23—52 X
3,304,153    2/1967    Bakker et al. _____ 23—52

HERBERT T. CARTER, Primary Examiner

U.S. Cl. X.R.

106—62